(12) United States Patent
Nir (10) Patent No.: US 7,088,881 B2
(45) Date of Patent: Aug. 8, 2006

(54) INTEGRATED OPTICAL SWITCHING DEVICE

(76) Inventor: David Nir, 4A Mevo Ga'aton Street, 69358 Tel Aviv (IL)

(*) Notice: Subject to any disclaimer, the term of this patent is extended or adjusted under 35 U.S.C. 154(b) by 747 days.

(21) Appl. No.: 10/130,166

(22) PCT Filed: Sep. 16, 2001

(86) PCT No.: PCT/IL01/00879

§ 371 (c)(1),
(2), (4) Date: May 14, 2002

(87) PCT Pub. No.: WO02/25320

PCT Pub. Date: Mar. 28, 2002

(65) Prior Publication Data

US 2003/0002780 A1 Jan. 2, 2003

Related U.S. Application Data

(60) Provisional application No. 60/233,659, filed on Sep. 19, 2000.

(51) Int. Cl.
*G02B 6/26* (2006.01)
*G02B 6/42* (2006.01)

(52) U.S. Cl. ........................................... 385/16; 385/17
(58) Field of Classification Search ............... 385/16–23
See application file for complete search history.

(56) References Cited

U.S. PATENT DOCUMENTS

| 4,618,210 | A | | 10/1986 | Kondo |
| 4,787,693 | A | | 11/1988 | Kogelnik et al. |
| 4,846,542 | A | | 7/1989 | Okayama et al. |
| 5,173,747 | A | * | 12/1992 | Boiarski et al. ............ 356/481 |
| 5,416,861 | A | * | 5/1995 | Koh et al. ..................... 385/14 |
| 5,528,710 | A | * | 6/1996 | Burton et al. ................. 385/16 |
| 5,729,642 | A | | 3/1998 | Thaniyavarn |
| 5,838,844 | A | * | 11/1998 | Van Dam et al. ............ 385/14 |
| 5,915,051 | A | * | 6/1999 | Damask et al. ............... 385/16 |
| 6,253,000 | B1 | * | 6/2001 | Madsen et al. ............... 385/16 |
| 6,263,125 | B1 | * | 7/2001 | Nir ............................. 385/17 |
| 6,393,186 | B1 | * | 5/2002 | Deacon ....................... 385/50 |
| 6,430,329 | B1 | * | 8/2002 | Nir ............................. 385/17 |
| 6,522,794 | B1 | * | 2/2003 | Bischel et al. ................. 385/4 |
| 6,549,688 | B1 | * | 4/2003 | Bazylenko ................... 385/14 |
| 6,597,669 | B1 | * | 7/2003 | Takahashi et al. .......... 370/325 |
| 6,621,258 | B1 | * | 9/2003 | Davidson et al. ............ 324/96 |
| 6,629,713 | B1 | * | 10/2003 | Duffy et al. ............... 292/332 |

FOREIGN PATENT DOCUMENTS

WO    WO 99/60434    11/1999

OTHER PUBLICATIONS

Thylen, L., "Integrated Optics in $LiNbO_3$: Recent Developments in Devices for Telecommunications", *J. Lightwave Technology*, 6(6):847–861, 1988.

Awdeh et al, "Survey of ATM Switch Architectures", *Comput. Networks ISDN Syst.*, vol. 27, pp. 1567–1613, 1995.

* cited by examiner

*Primary Examiner*—Joseph Williams
*Assistant Examiner*—Peter Macchiarolo (57) ABSTRACT

An integrated optical switching device includes a substrate formed with a plurality of optical input waveguides, a plurality of optical output waveguides, and a plurality of optical switching elements for selectively connecting the optical input waveguides to the optical output waveguides; characterized in that at least some of the waveguides include tight bends having a radius of curvature of less than 100 μm. Also described are compact switching devices of high port count including coaxial arrays of input and output switch columns interconnected according to a double-crossbar architecture.

29 Claims, 8 Drawing Sheets

INTEGRATED OPTICAL SWITCHING DEVICE

This application claims the benefit of Provisional Application No. 60/233,659, filed Sep. 19, 2000.

FIELD AND BACKGROUND OF THE INVENTION

The present invention relates to integrated optical switching devices, and particularly to such devices for use in high-speed data communication applications, such as in packet switching.

The rapid growth in transmission bandwidths of fiber-optic networks is enabled by, among several critical factors, enhanced switching performance with respect to both switching speed and signal routing. High speed and large port-count switch arrays are becoming progressively important for high-speed data transmissions applications, in particular those supporting packet switching. Various array architectures have been developed as described for example in; R. Y. Awdeh, H. T. Mouftah: *Survey of ATM Switch Architectures"*, Communications Networks and ISDN systems, Vol. 27, pp. 1567–1613, November 1995 (Elvesier Science); L. Thylen, *Integrated Optics in LiNbO$_3$: Recent Developments in Devices for Telecommunications*, Journal of Lightwave Technology, Vol. 6, No. 6, June 1988 (pages 847–861); U.S. Pat. No. 4,618,210; U.S. Pat. No. 4,787,693; and International Publication No. WO 99/60434, published 25 Nov. 1999.

However those optical switching devices that support minimum level of route-control processing complexity are more suitable for high-speed switch response. Reduced routing procedures are provided by a family of array architectures, in particular the crossbar and its derivative—the double-crossbar; see for example the R. A. Spanke publication cited above. Other designs are known as the DC, PILOSS, TREE. Recently an SNB (strictly-non-blocking) 16×16 switch-array based on the TREE architecture and implemented in Z-cut LN, was reported [S. Thaniyavarn, Proceedings OFC-97, TuC1]. The TREE based device consists of three parts: fan-out, fan-in, and a mid-section consisting of a large silica/Si substrate, housing the connections between the 256 ports in both the input and output midplanes.

The above-cited International Publication No. WO 99/60434 reported a recent study of a DC (Deliver and Couple) type array architecture, based on radial layout implemented Z-cut LN and TM guidance, which was shown to support a 16×16 port-count with <10 nSec reconfiguration time. The short switching-speed was aided by the fact that in only 2N switches (out of 2N$^2$ switches) are activated at each of the possible N! route options, and the path setting is achieved merely by straightforward selection of the input-output ports. LN Z-cut substrate accommodates operation in the TM mode, independently of the propagation angle on the substrate, due to the invariance of the refractive indexes at the propagation plane (which is not possible with X or Y cut LN). Since the major electro-optic effect operates perpendicularly to the substrate surface in this case, the switches may be oriented at any angle. In particular, the switches may be designed with curvatures. While the routing procedure is much the same as that of the crossbar architecture (or the double-crossbar), the design has the disadvantage of route-dependent switch paths (i.e. paths having 2 to N+1 switches), which becomes a significant issue when the individual switch losses exceed a certain level.

The double-crossbar architecture, on the other hand, supports a similar path control procedure, and has the advantage of equal switch-paths (always N+1). However, implementation of the double-crossbar by conventional waveguide elements is entirely impractical due to the very large number of waveguide intersections at shallow angles, which induce high losses and cross-talk levels, and in consequence lead to excessive array length.

OBJECTS AND BRIEF SUMMARY OF THE INVENTION

An object of the present invention is to provide an integrated optical switching device having advantages in the above respects, and particularly to provide such a device which enables high packing density of waveguide elements on a single substrate. A further object of the invention is to provide an integrated optical switching device which can be implemented in a double-crossbar switching network.

According to one aspect of the present invention, there is provided an integrated optical switching device comprising a substrate formed with a plurality of optical input waveguides, a plurality of optical output waveguides, and a plurality of optical switching elements for selectively connecting the optical input waveguides to the optical output waveguides; characterized in that at least some of the waveguides include tight bends having a radius of curvature of less than 100 μm.

According to further features in the described preferred embodiments, at least some of the tight bends define an angle of approximately 90° and have a radius of curvature of 20–60 μm. Such a construction permits very close spacing of less than 150 μm, preferably about 75 μm between waveguides. In addition, the 90° crossings generate very low scattering losses and cross-talk.

According to further features in the described preferred embodiments, the tight bends, or at least some of them, are total internal reflection trench mirrors formed in the substrate, for example as described in H. Han et al, *Self-Aligned High-Quality Total Internal Reflection Mirrors*, IEEE Photonics Technology Letters, Vol. 7, No. 8, August 1995 (pages 899–901), which publication is hereby incorporated by reference. The tight bends, or at least some of them, may also be tight ridge bends formed in the waveguides.

According to another aspect of the present invention, there is provided an integrated optical switching device, comprising: a circular wafer substrate formed with a plurality of optical input waveguides, a plurality of optical output waveguides, and a plurality of optical switching elements for selectively connecting the optical input waveguides to the optical output waveguides; the waveguides and switching elements defining a double-crossbar switching network arrayed according to a circular geometry; at least some of the waveguides including tight bends having a radius of curvature of less than 100 μm and spaced from adjacent waveguides by a space of less than 150 μm.

According to further features in the described preferred embodiments, the double-crossbar switching network includes a first circular array of input switch columns defining optical switches interconnected according to a first crossbar architecture, and a second circular array of output switch columns defining optical switches interconnected according to a second crossbar architecture; the second circular array of output switch columns being coaxial with, and connected to outputs of, the first array of input switch columns.

In the described preferred embodiments, the second circular array of output switch columns is located on the substrate outwardly of the first circular array of input switch columns.

The foregoing features enable integrated optical switching devices to be constructed having a number of important advantages over the prior art constructions briefly described above.

A particularly important advantage is that these features enable optical switching devices to be constructed according to the DCB (double-crossbar) architecture. Thus, by employing either 90° reflecting 3D mirrors, or tight ridge-waveguides bends, and also by implementing a radial geometry, the DCB architecture yields a superior packing-factor (i.e. number of switches or array dimensions) compared to the DC (delivery and couple) architecture. The 3D mirrors may be fabricated by the high precision "RIE" (reactive ion etching) process to provide high facet quality. Such 3D mirrors have previously been incorporated in commercial processing of laser diodes based on III–V materials (Oliver Graydon, Opto-Laser Europe, October 97, p. 11), but not in optical switch-arrays. Etched surfaces are employed for 90° reflection in optical switch-arrays. The 45° facet-angle provides for total-internal-reflection (TIR) if the two materials index-ratio >1.4 (in the LN case the ratio is 2.14 and in the case of silica waveguides it is 1.45).

Alternatively, tight ridge-waveguide bends may also be employed. In such case a similar effect is obtained and also the fabrication is easier.

The proposed layout is optimal in most aspects of connection path efficiency, except for the different number of crossings in the different paths. However, in this case, this is a relatively minor matter since waveguides intersecting at ~90° have practically negligible losses (when $\Delta N<<N$, as is the case in LN substrates, where $\Delta N$ is the waveguide index-perturbation).

In addition to providing for better area utilization, and thereby higher packing density, as compared to the DC architecture, the foregoing features permit improved processing uniformity, as compared to other designs, thereby also improving the pattern accuracy as well as the uniformity of the switching voltages (between the array's switches).

According to still further features in one preferred embodiment described below, the input waveguides include a plurality of input rows, with each input row including a splitter for splitting the respective input row into a plurality of branches (preferably two); and the output waveguide includes a combiner for each plurality of the branches for combining them into their respective output waveguides. In this setup the "maximum cross-talk figure" of any of the array's outputs is reduced markedly (from a maximum of $\sim[N-2]X^2$ to $\sim[N/2-1]X^3$, where X is the fractional cross-talk of the switch, and N is the number of the array columns/rows). As an example, the maximum cross-talk figure of the switch array will be the same when the switch cross-talk is −20 dB in the former design and 13.5 dB in the design discussed here. This allows the relaxation of the critical design parameters of the individual switch, while the overall performance improves.

As indicated above, the invention is particularly useful in applications wherein the switching elements define a DCB (double-crossbar) switching network. In one described embodiment, the substrate is a three-inch circular LN wafer, and the DCB switching network includes an array of 16×16 to 20×20 switching elements arrayed according to a circular geometry; in a second described embodiment, the substrate is a four-inch circular LN wafer, and the DCB switching network includes an array of 16×16 to 24×24 switching elements arrayed according to a circular geometry; in a third described embodiment, the substrate is a five-inch circular LN wafer, and the waveguides and switching elements define a DCB switching network of up to 32×32 switching elements. Such packing densities have heretofore not being obtainable insofar as the inventor is presently aware (on a single substrate, and while supporting the strictly-non-blocking property).

Preferably, the substrate is a Z-cut lithium niobate (LN) substrate. However, the invention could be implemented as well with other substrate materials. A most attractive option is the electro-optic polymer (EO-polymer) waveguide patterned on a silicon substrate (or other substrates such as quartz). A particularly attractive option is the silica/electro-optic polymer (EO-polymer waveguide composite (or similarly silicon oxy-nitride instead of silica), patterned on a silicon substrate. By this method, as an example, the EO polymer is patterned between the silica waveguides at the switch zone. The silica waveguides presently have the lowest propagation losses. With adequate switch design, light propagates predominantly in the low loss silica waveguides at the straight through state, and permeates the higher loss EO polymer medium when at the cross state. Since the refractive indexes of silica and EO-polymer are nearly the same, the transition between the two mediums is virtually without loss. Silica waveguides are easily designed for tight bends or alternatively can be easily etched to provide high quality 45° TIR mirrors. Silica or polymer waveguide technologies can be patterned on substrates with diameters as large as 6 or 8 inches, potentially supporting array designs with port counts higher than 32×32 on a single substrate. However, in practice, the choice of the substrate materials depends on the propagation loss, electrical power consumption, and finally pattern uniformity, according to the processing technology available at the time.

According to still further features in another preferred embodiment described below, the substrate is of a rectangular shape and the waveguides in the arrays are patterned accordingly, in a rectangular loop. This embodiment may be particularly useful with silica or polymer waveguide technologies, and provides improved utilization of the substrate area.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF PREFERRED EMBODIMENTS

Figure 1:
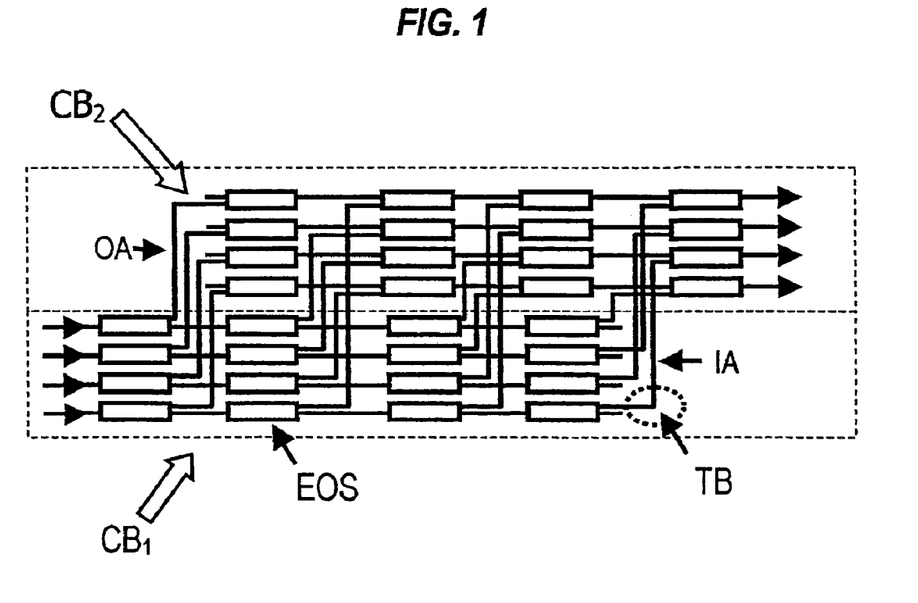
FIG. 1 diagrammatically illustrates an array of waveguides and switching elements defining a double-crossbar (DCB) switching network.
Figure 1A:
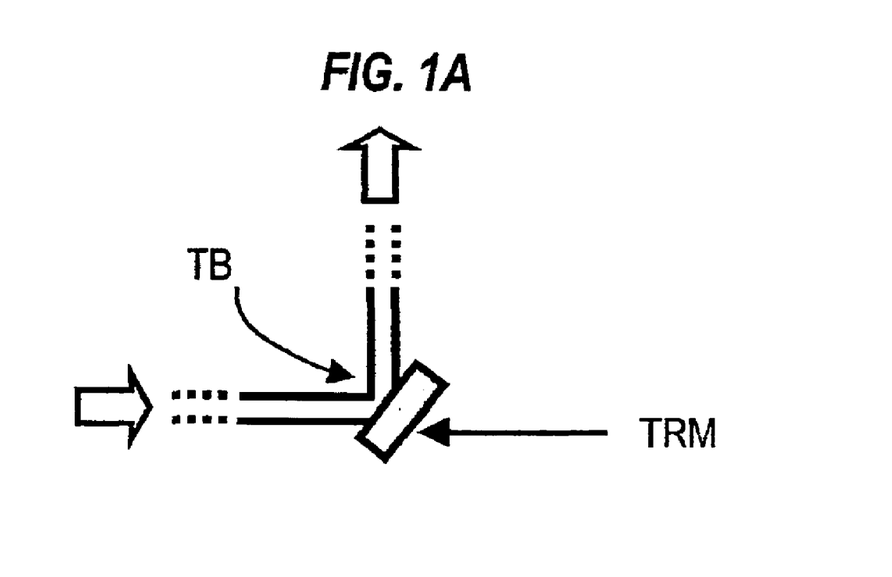
FIG. 1a diagrammatically illustrates one form of tight bend (TB) in the switching network of FIG. 1, namely one in the form of a knee bend with a total internal reflection TIR) trench mirror.
Figure 1B:
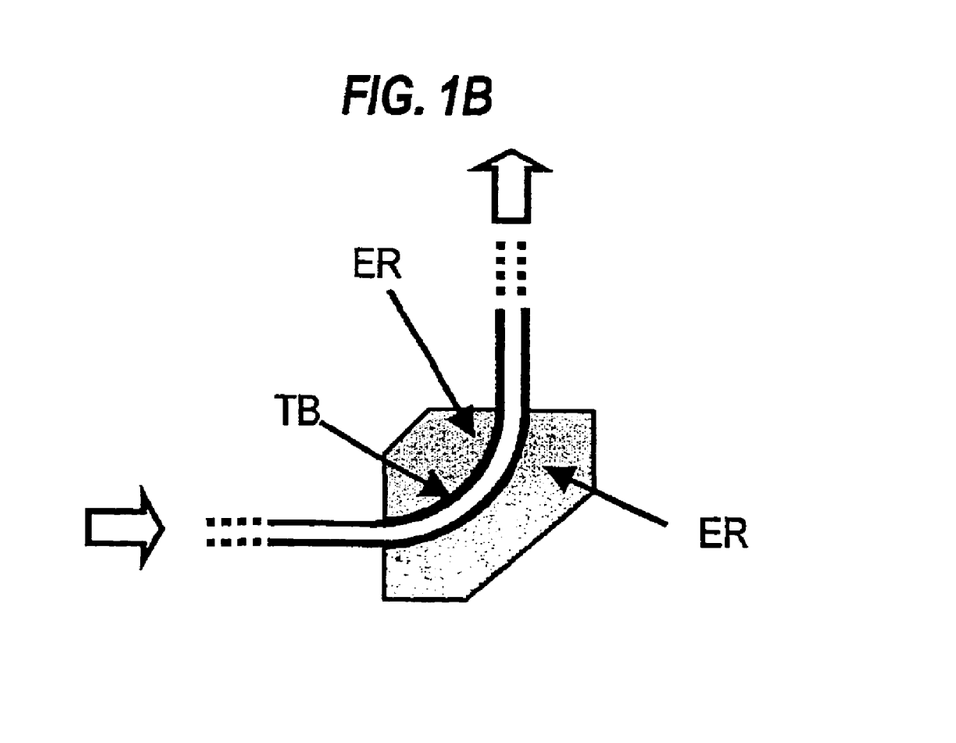
FIG. 1b diagrammatically illustrates another form of tight bend (TB) in the switching network of FIG. 1, namely one in the form of a tight ridge formed in the waveguide.

FIG. 1 diagrammatically illustrates a plurality of waveguides and switching elements defining a double-crossbar (DCB) switching network. Thus, as shown in FIG. 1, a first group of waveguides and switching elements are arranged to define a first crossbar (CB) indicated by box $CB_1$ serving as an input array IA, and another group of waveguides and switch elements are arranged to define a second crossbar, indicated by box $CB_2$ connected to the output ends of the crossbar $CB_1$, of the input array, IA, and serving as an output array OA. The waveguides of the input array IA are connected by tight bends TB to the waveguides of the output array OA. Each tight bend TB may be as shown in FIG. 1a or FIG. 1b, to define an angle of approximately 90° and to have a radius of curvature of less than 100 μm, preferably of 20–60 μm.

As shown in FIG. 1, each of the electro-optical switches EOS in the input array IA is of the 1×2 type, wherein a signal appearing in an input waveguide may be selectively passed through the interaction zone to appear in the same waveguide at the output, or crossed in the interaction zone to appear in an adjacent waveguide. On the other hand, each of the electro-optical switches EOS in the output array OA is of the 2×1 type, wherein the signal on either of two input waveguides is controlled to pass through the interaction zone into the output waveguide.

The switching array illustrated in FIG. 1 is of a SNB (Strictly Non-Blocking) architecture, and includes a 4×4 array, requiring 2×4×4, or 32, electro-optical switches EOS. That is, each path requires the activation of two switches, such that for any routing configuration, 2×N switches are to be activated out of the 2×N×N. Such an array prevents the occurrence of conflicting paths, and supports broadcast and multicast.

Further details of the operation of such DCB (double-crossbar) switching networks are described in the literature, for example in the above-cited 1987 publication of R. A. Spanke, incorporated herein by reference. However, as described earlier, the double-crossbar switching network diagrammatically illustrated in FIG. 1 was, as a practical matter, heretofore impossible to be implemented on an integrated optical wafer because of the very large number of waveguide intersections at shallow angles, which induce high losses and cross talk noise, and in consequence, lead to excessive array lengths.

According to the present invention, such a DCB switching network is implemented by providing the waveguides, or at least some of them, with the tight bends shown at TB in FIG. 1. Each of the tight bends TB has a radius of curvature of less than 100 μm, preferably in the order of 20–60 μm. FIGS. 1a and 1b illustrate two manners of producing such tight bends.

Thus, FIG. 1a illustrates the tight bend TB between the two waveguides in the form of a 90° waveguide knee bend with a total internal reflection (TIR) trench mirror TRM formed in the substrate. The above-cited publication of 1995 by H. Han et al, incorporated herein by reference, describes one manner of fabricating such a TIR mirror using a reactive ion etching (RIE) technique.

FIG. 1b illustrates another manner of forming such a tight bend TB, wherein the waveguide is formed as a tight ridge bend in the substrate, by etching the regions ER surrounding the bend. The bend radius could be in the order of tens of μm. Preferably, a substantially 90° bend is formed with a radius of 20–60 μm. The bend losses due to radiation decrease with increased confinement degree. In LN waveguides, the confinement degree is very high because of the large index difference of the substrate and the air (2.15 vs 1). This is to be distinguished from other waveguides wherein the index contrast is very small, in which case typical low loss radii are larger by several orders of magnitude, e.g., radii of millimeters or tens of millimeters.

As described more particularly below, providing such tight bends TB produces a number of important advantages in integrated-optical switching devices in general, which advantages are particularly significant in DCB (double-crossbar) switching networks arrayed according to a circular geometry. Thus, such tight bends enable the spacings between the matrix rows to be extremely small, in the order of 75–150 μm, thereby permitting extremely high-packing density of optical switches on a single substrate. In addition, implementing the network in a circular format on a Z-cut LN substrate is permitted due to the non-limited angular orientation of the waveguides and switches when operating with the TM polarized optical mode. The resulting combined advantages are optimum radial symmetry, which also improves processing uniformity and therefore fabrication yield, and a high level of uniformity in the switching voltages.

Figure 2:
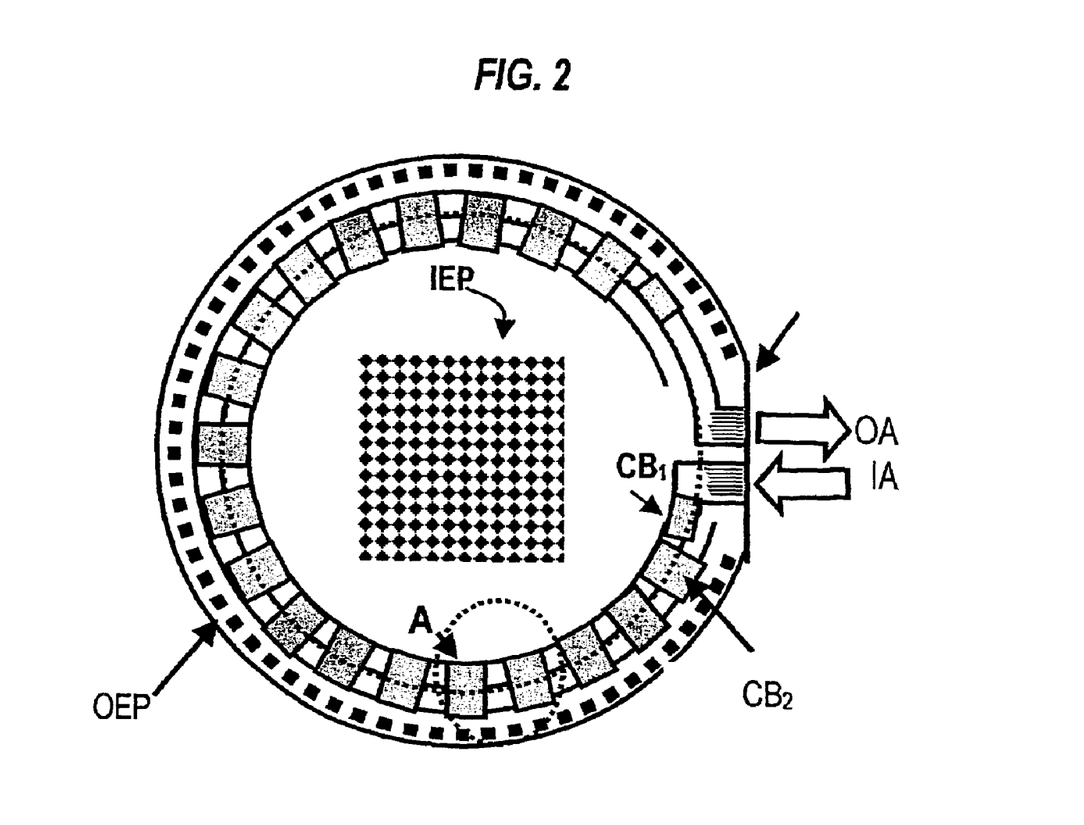
FIG. 2 diagrammatically illustrates a DCB switching network constructed in accordance with the invention in which the waveguides and switch elements are arrayed according to a circular geometry, the example illustrated being a 2×20×20 array implemented on a three-inch circular wafer.

FIG. 2 illustrates the invention implemented in a three-inch circular wafer formed with a DCB (double-crossbar) switching network including a 2×20×20 array according to a circular geometry. As shown in FIG. 2, each of the 20 switch columns in the input array IA includes an input crossbar $CB_1$ at the periphery of the circular wafer, and an output crossbar $CB_2$ also at the periphery of the wafer but outwardly of the input array crossbar $CB_1$. Crossbars $CB_1$, are interconnected to define a circular input array IA, and crossbars $CB_2$ are interconnected to define a circular output array OA coaxially with, and outwardly of, the input array IA.

As further shown in FIG. 2, the substrate further includes an inner array of electrical pads IEP arranged in a rectangular matrix on top of the substrate. Each pad is connected by a lead (not shown) to one particular switch in the array. The pads form the electrical contact points to the external control circuit, serving for selectively actuating the optical switches defined by the waveguides in the crossbars $CB_1$, $CB_2$ of the input and output arrays IA, OA, respectively. Pads IEP are connected to the external control-circuit by conventional wire bonds or alternatively by an overlying PCB (not shown). The illustrated substrate further includes a rectangular array of outer electrical pads OEP, outwardly of the waveguide crossbars $CB_1$, $CB_2$, these pads being accessed as well either by conventional bonding technology or by an overlying PCB.

Figure 2A:
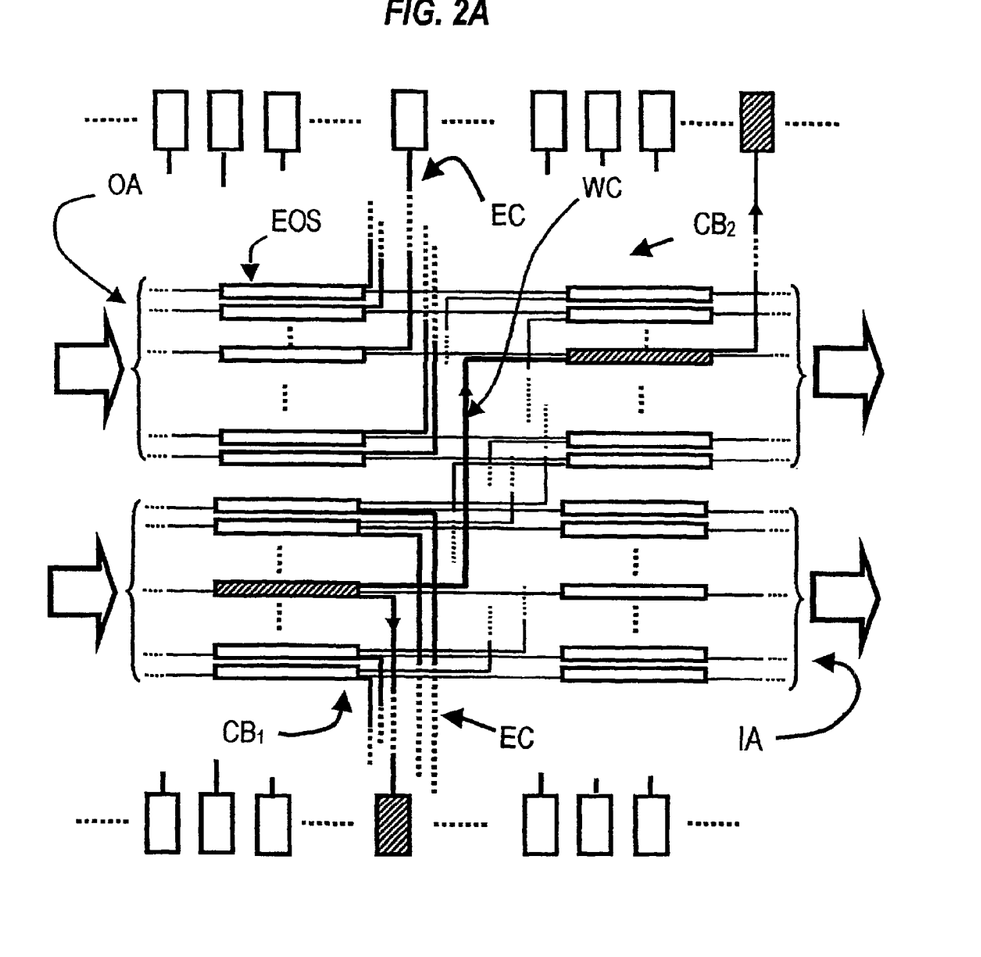
FIG. 2a is an enlarged fragmentary diagram illustrating the electrical and waveguide connections between two adjacent switch columns in area "a" in the wafer of FIG. 2.

FIG. 2a is an enlarged fragmentary view of region "A" in FIG. 2, more particularly illustrating the electrical and optical connections between the input array crossbar $CB_1$ and output array crossbar $CB_2$ in two adjacent switch columns.

FIG. 2a particularly illustrates a waveguide WC with two 90° bends, connecting between the crossbar $CB_1$ of the input array IA, and the crossbar $CB_2$ of the output array OA, as well as the electrical connections EC from the electro-optical switches EOS to the pads (of the indicated switched path). The entire path from input to output, traverses four 90° tight bends (e.g., reflections or tight ridge bends), and the total propagation path is approximately 200 mm.

Considering accepted values with the present technology processing techniques of 1.5 dB loss per tight bend by reflection, 0.1 dB/cm propagation loss, 0.5 dB coupling loss at the substrate interface, and negligible switch losses, the expected insertion losses would amount to approximately 9 dB. Even this would be acceptable in this application, but it is expected that improved processing techniques will even further reduce the insertion losses to about 6 dB.

Thus, a Z-cut LN three-inch wafer, with 100 μm spacing between the array rows, and with 4 mm spacing between the wafer perimeter and the external array row, can support an array of 16×16 to 20×20 switches, with the individual switch length of 6 mm. A properly designed 6-mm long switch can be switched with an amplitude of less than 15V. Electrodes at this length, with typical capacity range of ~5 pF, can alternate between switch states at <10 nSec by employing state-of-art electronics. Based on the above parameters, as an example in a 20×20 array of switches, the waveguide-array would be 4 mm in width, occupying a radial zone between R=29 mm and R=33 mm, and would have curvatures that have been proved previously to support sufficiently low propagation losses [E. Voges et. Al, *True time delay integrated optical RF phase shifters in lithium niobate*, Elec. Lett., Vol. 33, No. 23, pp. 1950–51, November 97]. Both factors, i.e. the array-pattern confinement in a narrow radial width, as well as the radial layout in itself, contribute to the fabrication uniformity, and therefore to the enhancement of the lithographic yield factors, in terms of both overall registration accuracy, and low fault probability.

Whereas the described construction can be implemented on a three-inch wafer to support an array of 16×16 to 20×20 switching elements, particularly a 2×20×20 array, this same construction can be implemented on a four inch Z-LN substrate to support an array of 16×16 to 24×24 switching elements, particularly a 2×24×24 array, with individual switch lengths of 7 mm. In addition, a considerably larger port count can be supported by the same substrate by splitting each annular array into two concentric ribbon of row bundles to form an array band.

Figure 3:
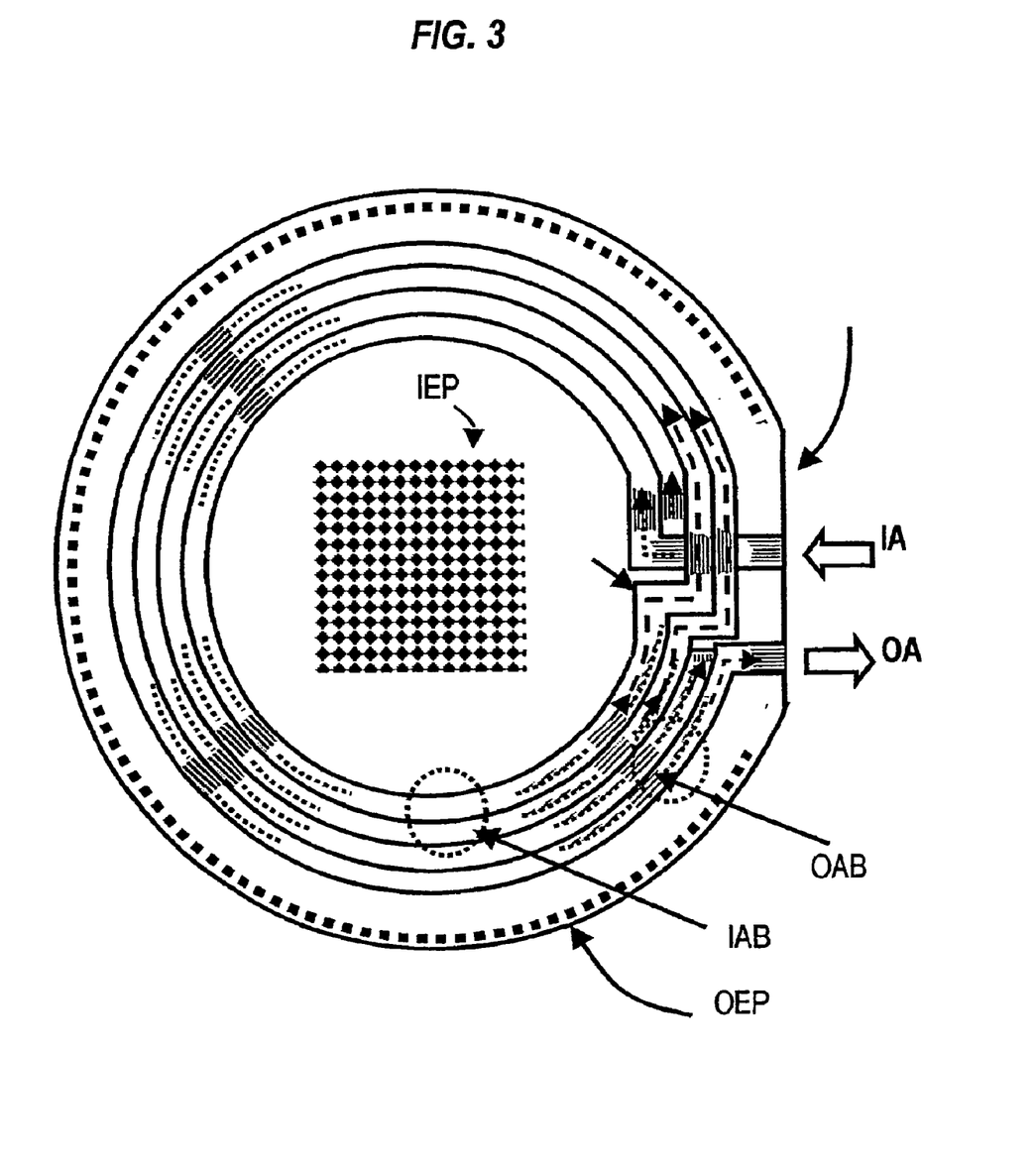
FIG. 3 illustrates another DCB switching network in the form of a circular DCB architecture with two concentric bands, constructed in accordance with the invention, implemented on a four-inch circular wafer and containing a 2×32×32 array.

Thus, FIG. 3 illustrates the invention implemented in a four-inch wafer formed with a double-crossbar switching network including a 2×32×32 array in two concentric ribbons or bands. As an example, a 2×32×32 array could be split into outer and inner interconnected annular bands (or row bundles) of 18 and 14 columns, respectively, with each column including 32 switches, and with an individual switch length of 7 mm. The innermost row in the inner ribbon (or row bundle) would have a diameter of 64 mm, thereby supporting very low curvature losses. The insertion loss is estimated to be of the order of 10–14 dB. The electrodes of the inner annular ribbon (or row bundle) are accessed electrically from the substrate's center zone, IEP, while those of the outer ribbons would be accessed electrically from the outer electrical pads OEP or by an overlying PCB.

Figure 4:
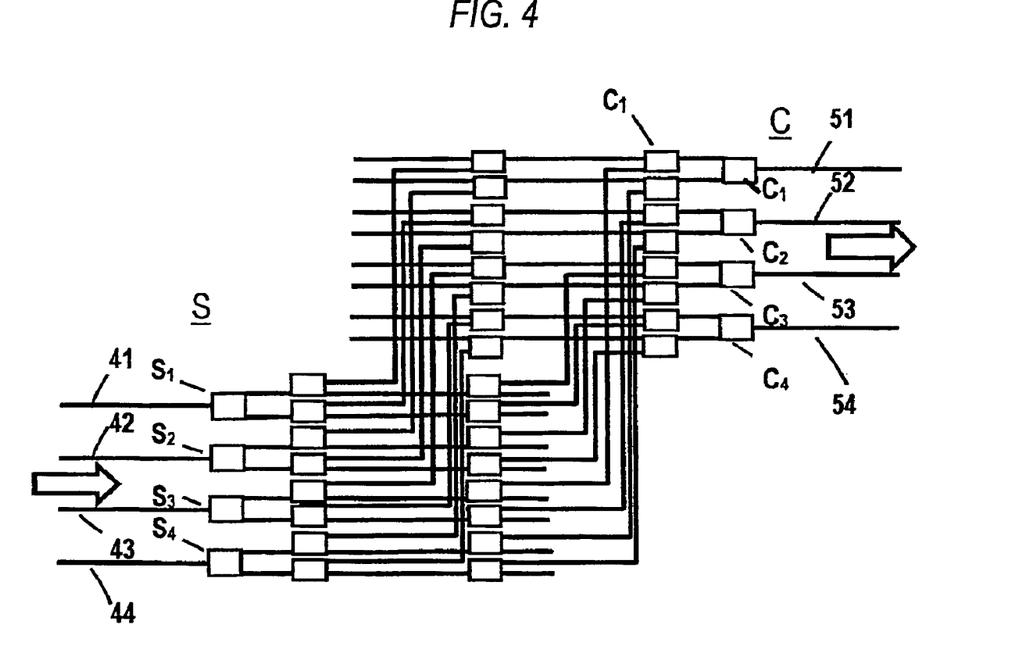
FIG. 4 illustrates a 4×4 DCB array with split rows showing one manner in which each input row waveguide may be split into two (or more) branches and the branches combined in the output waveguide.

FIG. 4 diagrammatically illustrates a technique using splitters S and combiners C particularly for switching networks having a large matrix of switching elements to occupy a relatively small-diameter wafer. Such a technique is particularly useful for providing a matrix of 2×32×32 switching elements arrayed in concentric circles on a four-inch wafer, as compared to a maximum of 2×24×24 using the design of FIG. 3.

Briefly, this technique involves: (1) splitting each of the input rows to a plurality (two) of branches at the input access; (2) combining the output rows in reversed fashion; and (3) increasing the number of electrical and optical connections to accommodate the above modification. This technique enables obtaining a 2×32×32 array on a four inch or five-inch Z-cut LN substrate.

FIG. 4 illustrates four input rows 41–44 coupled to four output rows 51–54, respectively. The coupling is accomplished with only two switch columns, instead of the four in the conventional DCB (double-crossbar) scheme, and with eight rows, which are actually four split rows. An N×N switch will require 2×N×N switches as previously, but also an additional 2×N switches for splitting at splitters $S_1$–$S_4$ and combining at combiners $C_1$–$C_4$, respectively.

By thus doubling the number of the rows, the number of the columns is halved, and therefore the effective switch column number is increased per given array length.

Figure 5:
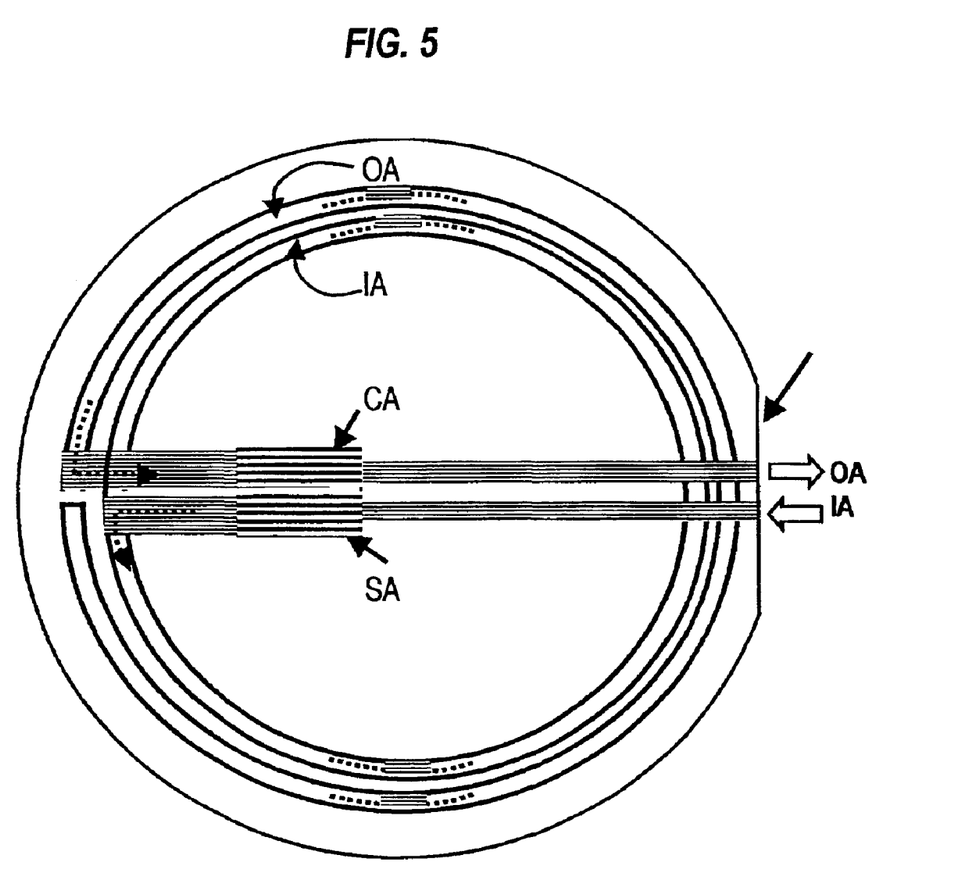
FIG. 5 illustrates a circular architecture of the DCB array showing one manner in which the splitting/combining technique of FIG. 4 may be implemented in a five-inch circular wafer to having a 2×32×32 array.

FIG. 5 diagrammatically illustrates an implementation of the splitting/combining technique of FIG. 4 applied to form, on a four-inch (or a five-inch) circular wafer, a DCB (double-crossbar) switching network including a 2×32×32 array. Preferably, the splitting and combining switch columns (SA and CA) are located at the central zone of the wafer, so that all the circular section is available for the switching columns.

The splitting/combining technique of FIG. 4 has the additional advantage of providing for reduced average crosstalk: Half of the possible paths in the switch array include the combining and splitting switches set at OFF state. The optical-power leakage from this half into the selected paths is reduced by a factor of $X^2$, where X is the fractional crosstalk of the switch.

Table I below sets forth various designs that may be implemented on Z-cut LN substrate in accordance with the above-described features:

TABLE I

| Substrate diameter | Port count | Array bands | Switch length [mm] | Row separation [μm] | Total switch number 2 × N × N | Minimum curvature radius [mm] |
|---|---|---|---|---|---|---|
| 3" | 16 | 1 | 8.5 | 100 | 512 | 30.0 |
| 3" | 20 | 1 | 6.2 | 100 | 800 | 28.5 |
| 4" | 20 | 1 | 9 | 100 | 800 | 41.5 |
| 4" | 24 | 1 | 7.4 | 100 | 1152 | 40.5 |
| 4" (a) | 32 | 2 (14/18) | 8.1 | 100 | 2048 | 31.5 |
| 5" (b) | 32 | 1 | 9 | 100 | 2048 | 45 |

\* spacing between vertical waveguides: 100 μm
\*\* spacing between vertical electrical leads: 25 μm
\*\*\* clearance from wafer perimeter and outer array row: 5 mm
(a) array architecture of two concentric bands (FIG. 3)
(b) array architecture of split rows (FIG. 4)

Figure 6:
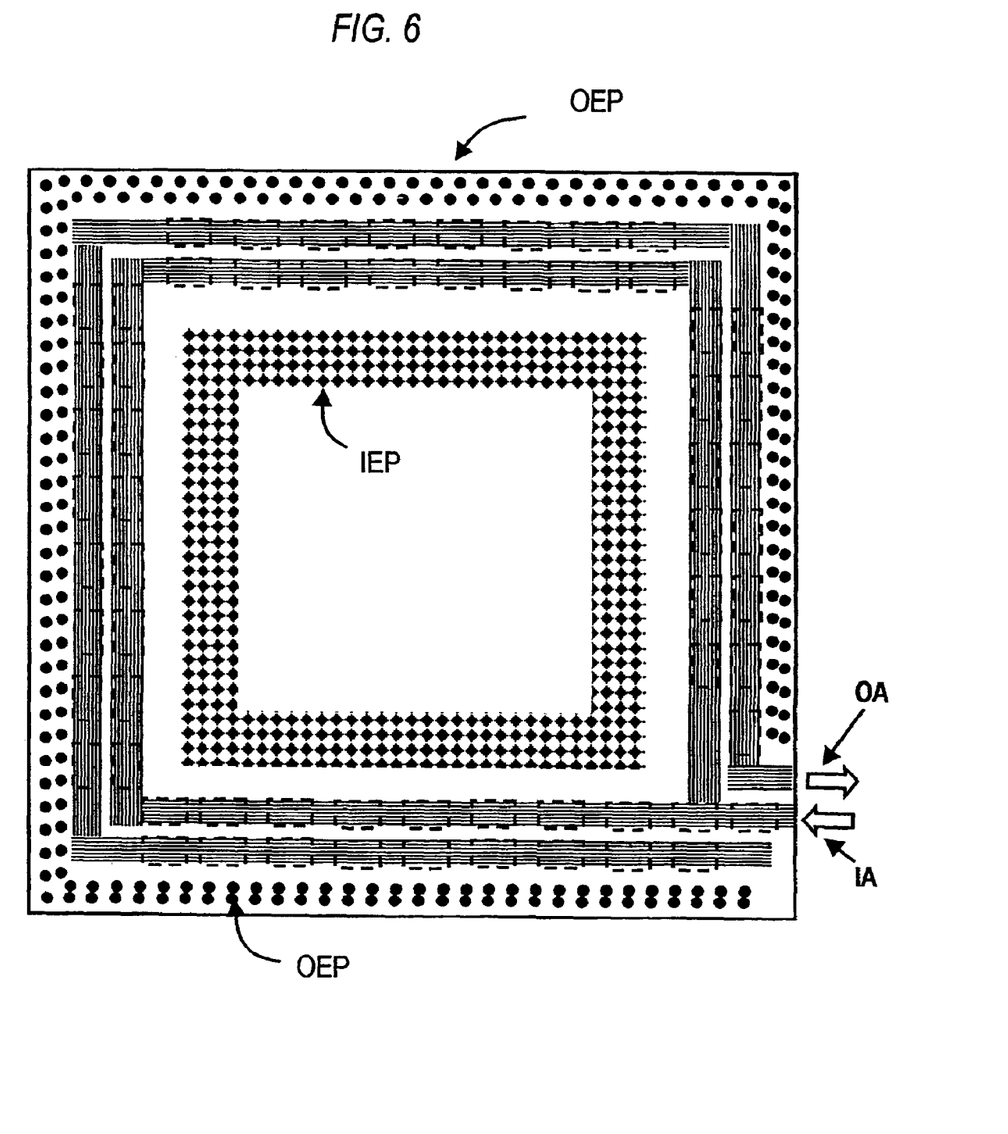
FIG. 6 illustrates a 2×32×32 DCB array with rectangular geometry as an example of a switching network constructed on a rectangular substrate where the arrays are patterned according to a rectangular geometry.

FIG. 6 diagrammatically illustrates an implementation of the same DCB architectures described in FIGS. 1–5 on a rectangular substrate. More particularly, it illustrates a 2×32×32 DCB array with rectangular geometry. This layout may be preferred when employing silica or polymer waveguides.

The described switch-array concept may be implemented, in general, with all known substrate materials that support TIR trench mirrors of adequate quality, or tight ridge waveguide bends. Fabrication may be done by a routine fabrication sequence, e.g., as follows: (1) pattern the waveguides; (2) apply the waveguide cladding; (3) pattern the electrodes; (4) fabricate the knee-bends/ridge-bends; (5) package in a box; (6) make the electrical connections (by conventional wire-bonding and/or flip-chip contacting); and (7) make the fiber ribbon connections ("pigtailing").

The electrical leads from the electrodes to the pads, in the particular radial switch design, extend either into the substrate's center or to the substrate's perimeter (likely to both zones). Alternatively, the pads could be designed to share the electrode zones adjacent to the waveguides, and the electrical interfacing is achieved by employing the "flip chip" technology. By the latter option, spacing between the switch-columns otherwise occupied by the leads, according to the first option, can be used for increased switch lengths (and therefore for improved switch performance). The later method is also more efficient for interfacing large number of electrical ports with the PC (printed circuit) board.

In the above description, the examples referred to array dimensions of N×N. However, the Double-Crossbar architecture applies as well to array dimensions of N×M, where M≠N, N and M are the number of input and output ports, respectively.

While the invention has been described with respect to a number of preferred embodiments, it will be appreciated that these are set forth merely for purposes of example, and that many other variations, modifications and applications of the invention may be made.

What is claimed is:

1. An integrated optical switching device comprising:
 a wafer, operative as a substrate,
 an array of optical input waveguides, arranged on said substrate as an input batch, said array including at least 16 optical input waveguides;
 a same array of optical output waveguides, also arranged on said substrate, as an output batch;
 a same array of splitting optical switching elements, emerging from said array of optical input waveguides, each of said splitting optical switching elements having two outgoing ports:
 a straight-through outgoing port; and
 a switched outgoing port,
 wherein each of said switched outgoing ports leads to a tight bend section, having a radius of curvature of less than 100 μm, for bending a switched light beam by substantially 90°;
 a same array of combining optical switching elements, leading to said same array of optical output waveguides, each of said array of combining optical switching elements having two incoming ports:
 a straight-through incoming port; and
 a switched incoming port,
 wherein each of said switched incoming ports comes from a tight bend section, having a radius of curvature of less then 100 μm, so as to bend a switched light beam by substantially −90°;
 so that a light beam traveling from one of said switched outgoing ports to one of said switched incoming ports travels through two bend sections of a connecting waveguide, so as to make substantially 90° and substantially −90°, thus proceeding in a same direction as said straight-through outgoing port,
 wherein said splitting optical switching elements and said combining optical switching elements, together, selectively connect one of said optical input waveguides with a predetermined one of said optical output waveguides so as to form a double crossbar architecture, for a strictly non-blocking routing,
 and wherein said first array of optical input waveguides and said same array of optical output waveguides are configured substantially as two circular rings, and a spacing between two adjacent waveguides within each of said rings is less than substantially 250 μm.

2. The device according to claim 1, wherein said double crossbar architecture includes a first array of input switch columns defining optical switches interconnected according to a first crossbar architecture, and a second array of output switch columns defining optical switches interconnected according to a second crossbar architecture; said second array of output switch columns being coaxial with, and connected to outputs of said first array of input switch columns.

3. The device according to claim 2, wherein said second array of output switch columns is located on said substrate inwardly of said first array of input switch columns.

4. The device according to claim 2, wherein said substrate further includes electrical connections to said first and second arrays of switch columns leading to electrical pads located both inwardly of and outwardly of said first and second arrays of switch columns.

5. The device according to claim 1, wherein the radius of curvature of said tight bends is substantially between 20 and 60 μm.

6. The device according to claim 1, wherein at least some of said tight bends are tight ridge bends formed in the waveguides.

7. The device according to claim 1, wherein at least some of said tight bends are total internal reflection trench mirrors formed in the substrate.

8. The device according to claim 1, wherein said substrate is formed of Z-cut Lithium-Niobate (LN).

9. The device according to claim 1, said device is formed as:
said substrate, formed of silicon;
a film of a first polymer, on said silicon substrate, said optical input, output and connecting waveguides being formed of a second polymer and being embedded in said film of said first polymer; and
electro-optic polymer waveguides, forming optical switches and connecting said polymer waveguides.

10. The device according to claim 1, wherein said substrate is of silicon, said optical input, output, and connecting waveguides are of silica, and said switching elements include a switch interaction zone of an electro-optic polymer.

11. The device according to claim 1, wherein said substrate is of silicon, said optical input, output, and connecting waveguides are of silicon oxy-nitride, and said switching elements include a switch interaction zone of an electro-optic polymer.

12. The device according to claim 1, adapted for packet switching.

13. The device according to claim 1, wherein said spacing between two adjacent waveguides along said ring is less than substantially 200 μm.

14. The device according to claim 1, wherein said spacing between two adjacent waveguides along said ring is about 75 μm.

15. The device according to claim 1, wherein said wafer has a diameter of substantially 3 inches.

16. The device according to claim 1, wherein said substrate has a diameter of substantially 3 inches and said double crossbar architecture includes an array of between 2×16×16 and 2×20×20 switching elements arrayed according to said circular geometry.

17. The device according to claim 1, wherein said substrate has a diameter of substantially 4 inches and said double crossbar architecture includes an array of between 2×16×16 and 2×24×24 switching elements arrayed according to said circular geometry.

18. The device according to claim 1, wherein said substrate has a diameter of substantially 5 inches and said double crossbar architecture includes an array of between 2×20×20 and 2×32×32 switching elements arrayed according to said circular geometry.

19. The device according to claim 1, wherein said first array of optical input waveguides is formed as two loops, connected with tight bends and a connecting waveguide, and said same array of optical output waveguides are similarly configured substantially as two loops, connected with tight bends and a connecting waveguide, so as to form four rings in all.

20. The device according to claim 19, wherein said substrate is a four-inch circular wafer, and said waveguides and switching elements define a double crossbar architecture of between 2×20×20 and 2×32×32 switching elements.

21. The device according to claim 19, wherein said substrate is a five-inch circular wafer, and said waveguides and switching elements define a double crossbar architecture of between 2×20×20 and 2×32×32 switching elements.

22. The device according to claim 1, wherein said input waveguides include a batch of input rows, with each input row including a splitter for splitting the respective input row into two branches; and wherein said output waveguides includes a batch of output rows, with each output row including a combiner for combining said two branches into their respective output waveguides.

23. The device according to claim 22, wherein said input waveguides include a batch of split input rows, to form an input array of 2×N waveguides; and wherein said output waveguides include a batch of split output rows, to form an output array of 2×N waveguides.

24. The device according to claim 23, wherein the number of switch columns in said split input waveguides is N/2; and wherein the number of switch columns in said split output waveguides is N/2; and wherein the said device has N of said splitting switches at the input and N of said combining switches at the output, and wherein said array is configured as 2×(2×N)×(N/2).

25. The device according to claim 24, wherein said substrate is a four-inch circular wafer, and said waveguides and switching elements define a double crossbar architecture of between 2×20×20 and 2×32×32 switching elements.

26. The device according to claim 25, wherein said substrate is a five-inch circular wafer, and said waveguides and switching elements define a double crossbar architecture of between 2×20×20 and 2×32×32 switching elements.

27. An integrated optical switching device comprising:
a wafer, operative as a substrate,
an array of optical input waveguides, arranged on said substrate as an input batch, said array including at least 16 optical input waveguides;
a same array of optical output waveguides, also arranged on said substrate, as an output batch;
a same array of splitting optical switching elements, emerging from said array of optical input waveguides, each of said splitting optical switching elements having two outgoing ports:
a straight-through outgoing port; and
a switched outgoing port,
wherein each of said switched outgoing ports leads to a tight bend section, having a radius of curvature of less than 100 μm, for bending a switched light beam by substantially 90°;
a same array of combining optical switching elements, leading to said same array of optical output waveguides, each of said array of combining optical switching elements having two incoming ports:
a straight-through incoming port; and
a switched incoming port,
wherein each of said switched incoming ports comes from a tight bend section, having a radius of curvature of less then 100 μm, so as to bend a switched light beam by substantially −90°;
so that a light beam traveling from one of said switched outgoing ports to one of said switched incoming ports travels through two bend sections of substantially 90° and substantially −90°, thus proceeding in a same direction as said straight-through outgoing port,
wherein said splitting optical switching elements and said combining optical switching elements, together, selectively connect one of said optical input waveguides with a predetermined one of said optical output waveguides so as to form a double crossbar architecture, for a strictly non-blocking routing, wherein said first array of optical input waveguides and said same array of optical output waveguides are configured substantially as rectangles, and a spacing between two adjacent waveguides along said rectangle is less than substantially 250 µm, and wherein said rectangle corners comprise of same tight bends.

28. The device according to claim 27, wherein at least some of said tight bends are total internal reflection trench mirrors formed in the substrate.

29. The device according to claim 28, wherein the switching elements are made of electro-optic material.

* * * * *